United States Patent
Kaupert

(10) Patent No.: US 8,293,422 B2
(45) Date of Patent: Oct. 23, 2012

(54) FUEL CELL SYSTEM

(75) Inventor: Andreas Kaupert, Esslingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 299 days.

(21) Appl. No.: 12/577,990

(22) Filed: Oct. 13, 2009

(65) Prior Publication Data

US 2010/0092839 A1    Apr. 15, 2010

(30) Foreign Application Priority Data

Oct. 14, 2008 (DE) .......................... 10 2008 051 181

(51) Int. Cl.
*H01M 2/02* (2006.01)

(52) U.S. Cl. ........................................................ 429/452

(58) Field of Classification Search .................. 429/470, 429/452, 467, 469

See application file for complete search history.

(56) References Cited

U.S. PATENT DOCUMENTS

| | | | |
|---|---|---|---|
| 7,851,102 B2 * | 12/2010 | Andreas-Schott et al. | ... 429/470 |
| 2006/0024549 A1 * | 2/2006 | Andreas-Schott et al. | ..... 429/34 |
| 2007/0042254 A1 * | 2/2007 | Wozniczka et al. | ............. 429/35 |
| 2007/0248855 A1 * | 10/2007 | Reinert | ............................ 429/19 |

FOREIGN PATENT DOCUMENTS

| | | |
|---|---|---|
| JP | 01211868 | 8/1989 |
| WO | WO 2006012844 | 2/2006 |
| WO | WO 2006012844 A1 * | 2/2006 |

* cited by examiner

*Primary Examiner* — Patrick Ryan
*Assistant Examiner* — Wyatt McConnell
(74) *Attorney, Agent, or Firm* — McGlew and Tuttle, P.C.

(57) ABSTRACT

A fuel cell system (1) is provided, especially for a motor vehicle, with a fuel cell stack (2), which has a plurality of fuel cell elements (3). The elements (3) are stacked up one upon the other in which an electrolyte separates an anode space from a cathode space. A risk of damage is reduced during heating by a bracing housing (4), which accommodates the fuel cell stack (2) in its interior (5) and which has a pot part (6) and a cover part (7), which are or can be prestressed (with compressive force) towards one another by means of pulling elements (8) and which are supported in the interior (5) by mutually opposite front sides (10) of the fuel cell stack (2).

20 Claims, 4 Drawing Sheets

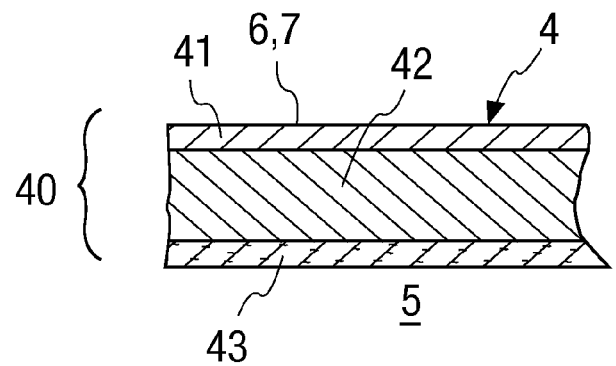
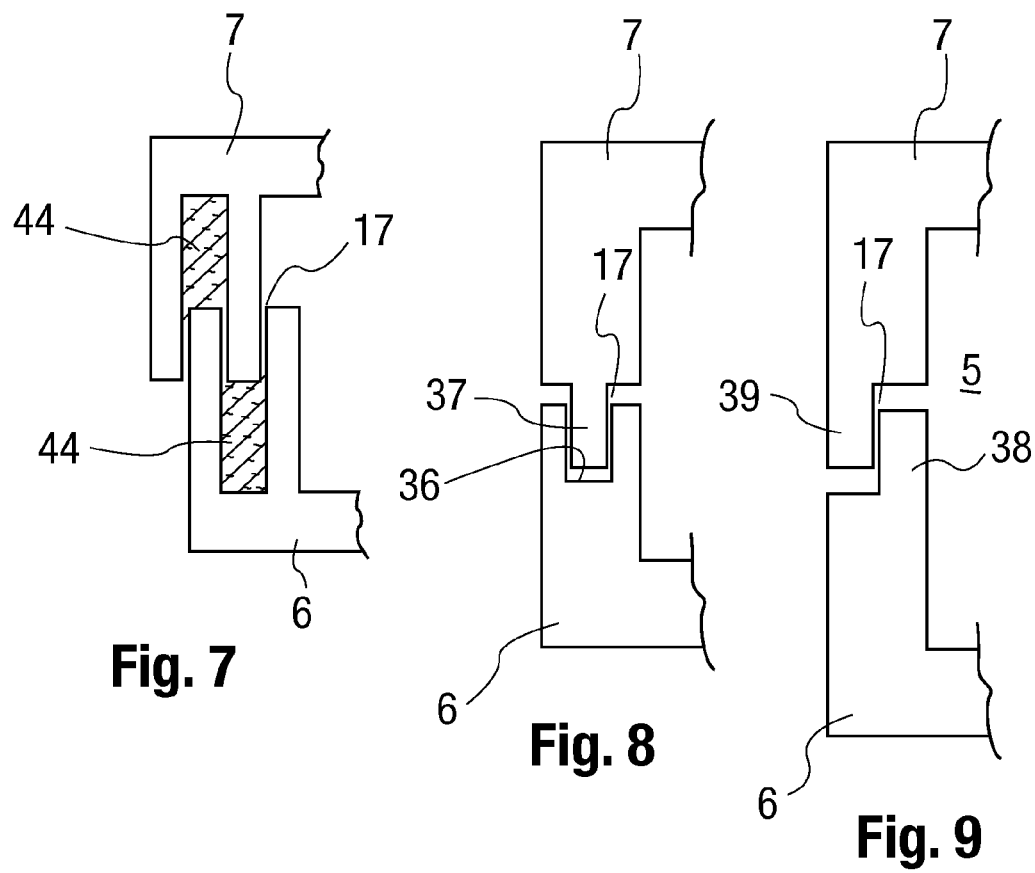

FUEL CELL SYSTEM

CROSS REFERENCE TO RELATED APPLICATIONS

This application claims the benefit of priority under 35 U.S.C. §119 of German Patent Application 10 2008 051 181.1 filed Oct. 14, 2008, the entire contents of which are incorporated herein by reference.

FIELD OF THE INVENTION

The present invention pertains to a fuel cell system, especially for a motor vehicle.

BACKGROUND OF THE INVENTION

A fuel cell system usually comprises a fuel cell stack, which has a plurality of fuel cell elements stacked up one upon the other. Each fuel cell element comprises an electrolyte, which separates an anode space from a cathode space. In an SOFC fuel cell, the electrolyte consists of a ceramic material. It is connected to a metallic frame in order to tap the electric current. The individual fuel cell elements are rigidly connected to one another via the metal frame in order to form the fuel cell stack.

Based on different expansion properties, it may happen during the heating of the fuel cell stack that the individual fuel cell elements will bulge or be deformed. This may lead, on the one hand, to rupture of the electrolyte, which is associated with an unintended leakage of cathode gas in the direction of the anode gas or vice versa. The subsequent reaction will then no longer take place electrochemically, but according to combustion. This may lead to destruction of the fuel cell system and possibly of the vehicle equipped therewith. On the other hand, deformation of the fuel cell elements leads to impaired electric contacting between the electrolyte and a corrugated metal plate, via which the electric current is tapped. For example, a contact paste is applied to improve contacting between the particular electrode and the corrugated metal plate. The deformation of the fuel cell elements will then be accompanied by a deformation of the corrugated metal plates, as a result of which contacting will decrease greatly. As a consequence, the electric current can be transmitted at individual contact surfaces only, which may lead to local overheating and to damage to the fuel cell.

SUMMARY OF THE INVENTION

The present invention pertains to the object of proposing an improved embodiment for a fuel cell system of the type described in the introduction, which embodiment is characterized especially in that the risk of damage to the fuel cell system is reduced.

According to the invention, a fuel cell system is provided comprising a fuel cell stack and a bracing housing. The fuel cell stack comprises a plurality of fuel cell elements stacked up one upon the other. Each of the fuel cell elements has electrolyte separating an anode space from a cathode space. The bracing housing accommodates the fuel cell stack in a housing interior space. The bracing housing includes a cover part with an interior side, a pot part with an interior side and pulling elements (force application elements). The fuel cell stack is supported in the interior space by the mutually opposite cover part interior side and pot part interior side. The pulling elements apply force to the cover part and to the pot part to apply force to the stack from opposite sides via the mutually opposite cover part interior side and pot part interior side.

The present invention is based on the general idea of prestressing the fuel cell stack by means of a bracing housing. Prestressing leads to the possibility of avoiding or at least markedly reducing bulging during the heating of the fuel cell stack. As a consequence, the risks associated with the deformation can be considerably reduced. It is specifically proposed for this by the present invention to equip the bracing housing with a pot part and a cover part, which are or can be prestressed towards each other by means of pulling elements. Inside the bracing housing, the two housing parts are supported directly or indirectly at opposite front sides of the fuel cell stack. Due to the design proposed, the bracing housing has a construction that can be embodied in a technically simple manner and can be manufactured at a correspondingly low cost.

Low-cost pulling elements are, for example, tightening straps, which are placed around the housing parts and can transmit strong pulling forces in the clamped state. As an alternative, it is also possible to use tie rods as pulling elements, for example, screws and threaded rods.

The housing parts may mesh with each other coaxially in relation to the prestressing direction, as a result of which it is, in particular, possible to make the prestressing housing gastight.

At least one of the housing parts can be supported directly at the fuel cell stack. One bottom of the particular housing part and one front side, especially an end plate, of the fuel cell stack are correspondingly made complementary to one another. In particular, these are especially flat surfaces. Effective transmission of forces can be achieved as a result between the fuel cell stack and the particular housing part.

In addition or as an alternative, at least one of the housing parts may be supported indirectly at the fuel cell stack via a support frame. It is possible by means of this support frame for at least one additional component of the fuel cell system, which is likewise arranged inside the prestressing housing, to be relieved of or uncoupled from the prestress of the prestressing housing. For example, the fuel cell system may contain a residual gas burner and a heat exchanger or a recuperator, which comprises a structural unit comprising the residual gas burner and the heat exchanger. These additional components may form, together with the fuel cell stack, a fuel cell module, which forms an assembly unit that can be completely preassembled. These additional components do not have to be prestressed and must not be prestressed, because they lack sufficient resistance to pressure. Said additional components can be uncoupled from the prestressing forces necessary to prestress the fuel cell stack by means of the support frame. It is possible due to this mode of construction to likewise accommodate these additional components of the fuel cell module inside the prestressing housing.

Especially advantageous is a variant in which the prestressing housing is designed as a heat-insulating insulation box. The prestressing housing assumes a dual function hereby. The heat insulation of the fuel cell stack or of the fuel cell module leads to increased overall efficiency of the fuel cell system, because the heat losses are reduced. In addition, the environment of the fuel cell system can be protected from overheating. This is especially advantageous when the fuel cell system is used in a motor vehicle.

Other important features and advantages of the present invention appear from the subclaims, from the drawings and from the corresponding description of the figures on the basis of the drawings.

It is obvious that the above-mentioned features, which will also be explained below, are applicable not only to the particular combination described, but in other combinations or alone as well without going beyond the scope of the present invention.

Preferred exemplary embodiments of the present invention are shown in the drawings and will be explained in more detail in the following description, where identical reference numbers designate identical or similar or functionally identical components.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a sectional view of the fuel cell system in the area of a wall of the bracing housing;

FIG. 7 is a greatly simplified schematic sectional view showing the bracing housing in the area of joints for one of various different embodiments;

FIG. 8 is a greatly simplified schematic sectional view showing the bracing housing in the area of joints for another of various different embodiments; and FIG. 9 is a greatly simplified schematic sectional view showing the bracing housing in the area of joints for another of various different embodiments.

DESCRIPTION OF THE PREFERRED EMBODIMENTS

Figure 1:
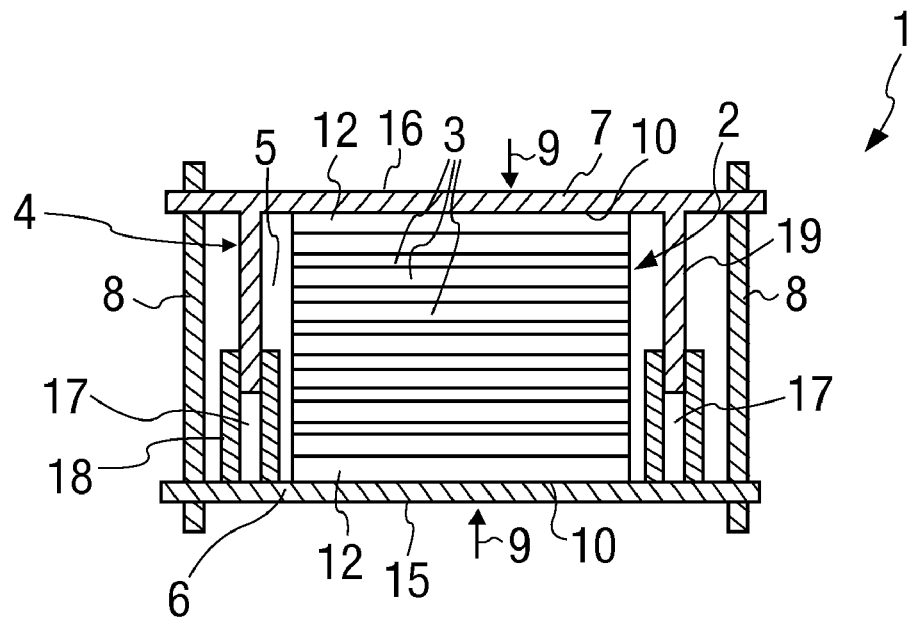
FIG. 1 is a greatly simplified schematic partially cut-away view of a fuel cell system showing one of various different embodiments.

Referring to the drawings in particular, corresponding to FIGS. 1 through 5, a fuel cell system 1, which may be used, for example, in a motor vehicle, comprises at least one fuel cell stack 2, which has a plurality of fuel cell elements 3, which are stacked up one upon the other and are rigidly connected to one another. Each fuel cell element 3 contains an electrolyte. not shown specifically here, for example, one made of ceramic, at which the anode and cathode of the particular fuel cell element 3 are formed. The electrolyte thus separates an anode space from a cathode space in the particular fuel cell element 3. The fuel cell stack 2 is preferably designed as an SOFC fuel cell. The fuel cell system 1 is used in the usual manner to generate electricity from an anode gas with a cathode gas and may form an additional electric energy source or the only electric energy source in a motor vehicle.

The fuel cell system 1 has a bracing housing 4 in the embodiments being shown here. The bracing housing 4 accommodates the fuel cell stack 2 in its interior 5. The bracing housing 4 has a pot part 6 and a cover part 7. The two housing parts 6, 7 have mutually complementary shapes, such that they surround and enclose the interior space 5 of housing 4 on all sides. In particular, the bracing housing 4 can be sealed hermetically. Thus, it is made especially gas-tight in order to prevent the emission of undesired gases into the environment of the fuel cell system 1.

Figure 2:
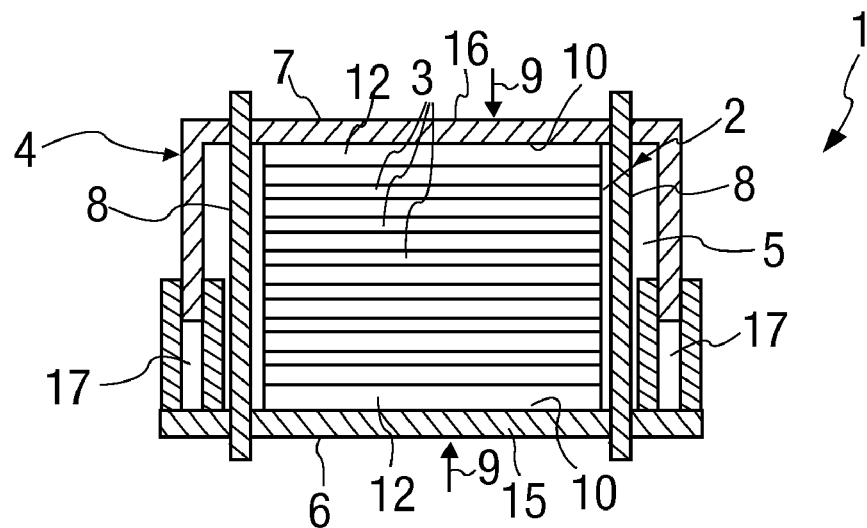
FIG. 2 is a greatly simplified schematic partially cut-away view of a fuel cell system showing another of various different embodiments.
Figure 3:
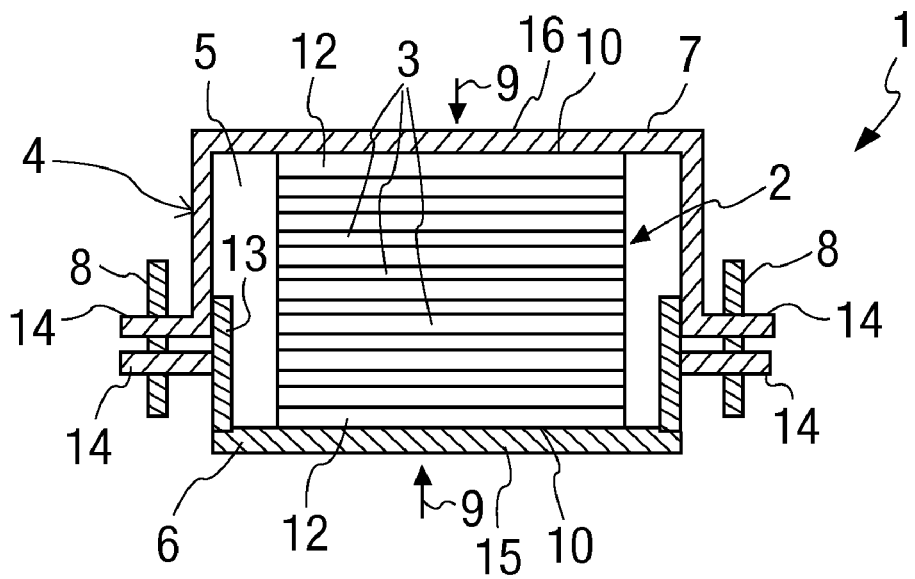
FIG. 3 is a greatly simplified schematic partially cut-away view of a fuel cell system showing another of various different embodiments.
Figure 4:
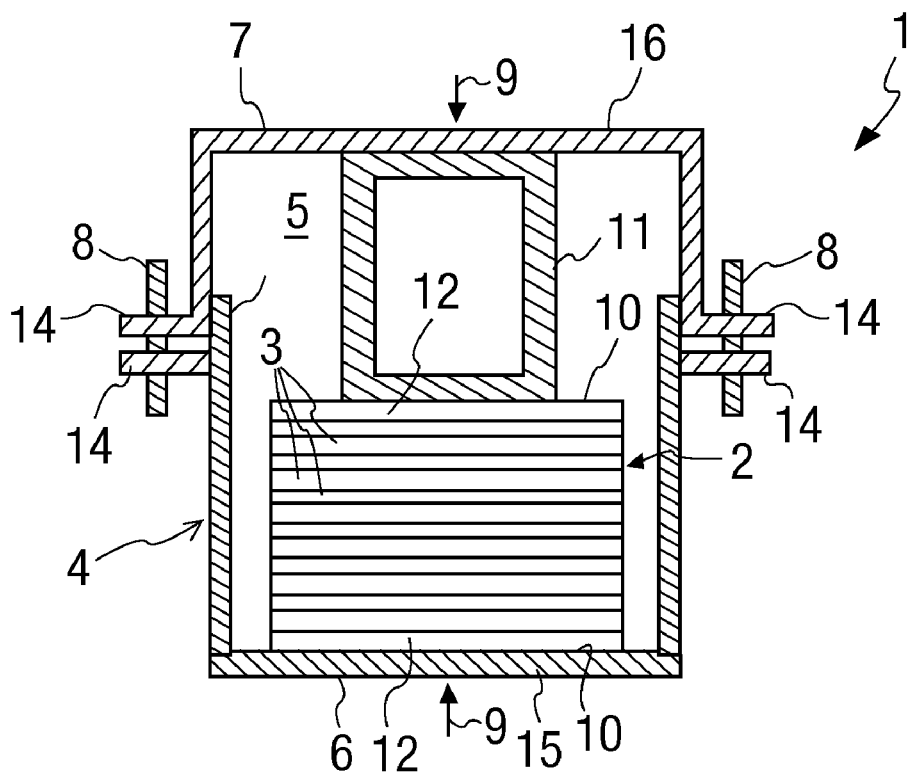
FIG. 4 is a greatly simplified schematic partially cut-away view of a fuel cell system showing another of various different embodiments.
Figure 5:
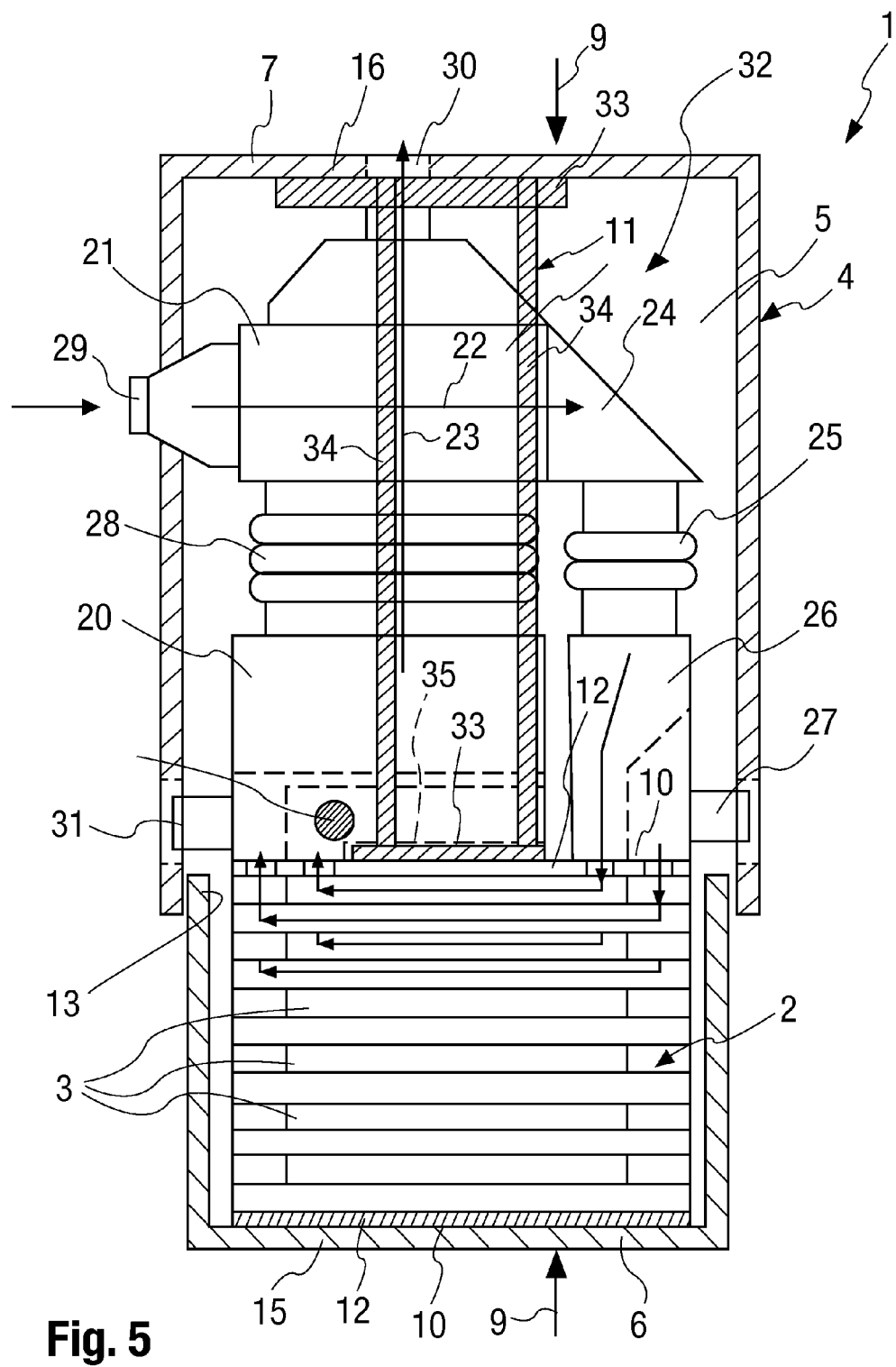
FIG. 5 is another view as in FIG. 4, but showing a special embodiment variation.

The bracing housing 4 comprises, besides, pulling elements 8, which are designed such that the housing parts 6, 7 can be prestressed (e.g., apply a force) towards each other by means of the pulling elements 8. As a result, pulling forces or prestressing forces 9, which are indicated by arrows in FIGS. 1 through 5 (applied ion a compressing or prestressing direction), can be applied to the housing parts 6, 7. The prestressing forces 9 are preferably directed in parallel to the pulling forces in the pulling elements 8. The housing parts 6, 7 are supported in the interior 5 at the fuel cell stack 2 at opposite front sides 10. Housing parts 6, 7 may be supported at the front sides 10 of the fuel cell stack 2 directly or indirectly. The embodiments according to FIGS. 1 through 3 show direct support between the housing parts 6, 7 and the fuel cell stack 2. Contrary to this, FIGS. 4 and 5 show an embodiment in which the pot part 6 is supported directly at the fuel cell stack 2 whereas the cover part 7 is supported at the fuel cell stack 2 indirectly, namely, via a support frame 11.

The pulling elements 8 in the embodiments according to FIGS. 1 through 4 are tie rods, which may be designed, for example, as screws or studs or threaded rods. These tie rods 8 may be supported at the particular housing part 6, 7 at heads and/or nuts via spring elements, e.g., plate springs or plate spring assemblies. In an alternative embodiment, the pulling elements 8 may also be designed as tightening straps, which extend around the housing parts 6, 7 and are tensioned to generate the prestress.

The fuel cell stack 2 has an end plate 12 each on the front side, at which the housing parts 6, 7 are supported directly or indirectly. The end plates 12 usually have the educt ports of the fuel cell stack 2. It is clear that corresponding recesses are prepared in the particular housing part 6, 7 in case of a direct contacting or direct supporting of one of the housing parts 6, 7 at an end plate 12 provided with educt ports in order to make it possible to guarantee access to the educt ports.

In the embodiments being shown here, the housing parts 6, 7 are plugged coaxially one into the other in relation to the prestressing direction 9 and are designed such that they engage one another coaxially. In the embodiments according to FIGS. 3 and 4, the pot part 6 has an axially projecting edge 13, over which extends the cover part 7 from the outside. On the one hand, axial guiding can be achieved hereby between the housing parts 6, 7. On the other hand, gas-tight coupling of the two housing parts 6, 7 can be made possible hereby. In the embodiments according to FIGS. 3 and 4, the two housing parts 6, 7 have at least one flange 14 each, on which at least one of the pulling elements 8 acts. In particular, a single flange 14, which may be designed as a flange extending circularly in the circumferential direction, may be provided per housing part 6, 7.

The front sides 10 of the fuel cell stack 2, which are formed at the end plates 12 here, are preferably made flat and extend at right angles to the prestressing direction 9. A bottom 15 of the pot part 6 and a bottom 16 of the cover part 7 are also preferably made flat at least on the side facing the interior 5 in order to ensure contacting with the particular front side 10 of the fuel cell stack 2 over a large area. The bottoms 15, 16 are preferably made flexurally rigid and likewise extend at right angles to the prestressing direction 9.

The tie rods 8 in FIGS. 1 and 2 are passed through the bottoms 15, 16 of the housing parts 6, 7. The tie rods 8 are arranged completely outside the interior space 5 in the embodiment according to FIG. 1, and they are therefore located exclusively on an outer side of the prestressing housing 4. For example, the bottoms 15, 16 of the housing parts 6, 7 may be extended for this outwardly for this on the edge.

Contrary to this, the tie rods 8 are passed through the interior 5 of the housing 4 in the embodiment shown in FIG. 2. This makes possible an especially compact design.

In all embodiments, the pulling elements 8 are supported at an outer side of the prestressing housing 4 in order to introduce the necessary pulling forces 9 into the housing parts 6, 7. The embodiments according to FIGS. 1, 3 and 4, in which the pulling elements 8 are located entirely on the outer side of housing 4, are characterized by improved heat tolerance. Due to their being arranged on the outside, the pulling elements 8 are not exposed to the high temperatures that may occur in the interior 5 of housing 4.

The bracing housing 4 may have a longitudinal guide 17 for the two housing parts 6, 7. This guide may be embodied, for example, by the mutual coaxial meshing of the housing parts 6, 7, as this is embodied, for example, in the embodiments according to FIGS. 3, 4 and 5. It is likewise possible to embody the longitudinal guide 17 by a double-walled edge or double-walled jacket, which is formed on one of the housing parts 6, 7 and is meshed by an edge or a jacket of the other housing part 7 coaxially in relation to the prestressing direction 9. A jacket 18 of the pot part 6 is designed as a double-walled and axially open jacket in the examples according to FIGS. 1 and 2, so that a jacket 19 of cover part 7 can mesh with the double-walled jacket 18 of the pot part 6 coaxially in relation to the prestressing direction 9. The two housing parts 6, 7 are guided at each other in parallel to the prestressing direction 9 by means of the longitudinal guide 17. This is advantageous for introducing the most uniform prestressing forces possible. The mutual meshing in the area of the longitudinal guide 17 improves, moreover, the insulation effect if the bracing housing 4 is designed as an insulation box. In addition, this mode of construction simplifies the embodiment of a gas-tight design of housing 4.

FIGS. 7 through 9 show additional embodiments of the joints between the two housing parts 6, 7, which may be designed as longitudinal guides 17. For example, FIG. 7 shows an embodiment in which the two housing parts 6, 7 are of a double-walled design in the area of the longitudinal guide and are axially open toward each other, so that they can be plugged one into the other coaxially in relation to the prestressing direction 9. FIG. 8 shows an embodiment in which the joint is designed in the manner of a tongue-and-groove connection. One housing part, here the head part 6, has an axially open groove 36, which is arranged on the front side and is engaged in a positive-locking manner by a groove 37, which is formed on the other housing part, here on the cover part 7 on the front side, and projects axially. FIG. 9 shows an embodiment in which the two housing parts 6, 7 have a stepped edge section each, which can be plugged coaxially one into the other. The head part 6 shows in the example an inner edge 38, which faces the interior 5 and projects axially on the front side, whereas the cover part 7 has, complementarily hereto, an outer edge 39, which faces away from the interior space 5 and projects axially on the front side.

A filling material, especially a sealing material 44, may fill out the cavities that may possibly be present in the area of these joints or longitudinal guides 17, (see, e.g., FIG. 7). For example, a diffusion barrier can be produced hereby.

The cover part 7 is likewise of a pot-shaped design in the embodiments being shown here, as a result of which a double-shell construction is obtained, on the whole, for the bracing housing 4.

The bracing housing 4 is designed especially as a heat-insulating insulation box and it reduces the heat loss by radiation into the environment of the fuel cell system 1 as a result. At the same time, the efficiency of the fuel cell system 1 is increased hereby. For example, the bracing housing 4 may have for this, corresponding to FIG. 6, a wall 40, which may have especially a multilayer design. In the example being shown, wall 40 has an outer skin 41 consisting of metal as a carrier layer and an insulation layer 42 consisting of a suitable heat-resistant, heat-insulating material. Ceramic materials are especially suitable here. In particular, the insulation layer 42 consists of a ceramic material, which can be pressed and sintered. In addition, a protective layer 43, which is arranged on the insulation layer 42 on a side facing the interior 5 is provided in the example in order to protect this insulating layer, for example, against damage. The protective layer 43 may be formed, e.g., from a fabric.

The support frame 11 shown in FIGS. 4 and 5 makes possible, on the one hand, the indirect supporting of one of the housing parts 6, 7, here of the cover part 7, at the fuel cell stack 2. On the other hand, this support frame 11 makes it possible to relieve or uncouple at least one additional component of the fuel cell system 1 from the prestressing forces 9. For example, the fuel cell system 1 according to FIG. 5 may have, in addition to the fuel cell stack 2, a residual gas burner 20, in which anode waste gas and cathode waste gas, which arrive from the fuel cell stack 2, can be thermally reacted in the form of a combustion reaction or as an alternative in the form of a catalytic reaction. Furthermore, the fuel cell system 1 may have a heat exchanger 21, which makes it possible to heat cathode gas, which is fed to the fuel cell stack 2. The heat of the burner waste gas generated by the residual gas burner 20 is used here. The heat exchanger 21 thus leads to a heat-transmitting coupling between a cathode gas route 22 and a burner waste gas route 23. On the outlet side, the heat exchanger 21 has a deflecting section 24 for the cathode gas route 22, which said deflecting section is connected to a distributor housing 26 via a compensator 25. The distributor housing 26 receives, on the one hand, the cathode gas of the heat exchanger 21 and, on the other hand, anode gas via an anode gas inlet 27. The distributor housing 26 is connected to the fuel cell stack 2 via the corresponding end plate 12. The residual gas burner 20 is connected to the heat exchanger 21 via another compensator 28. The burner waste gas route 23 passes through this additional compensator 28.

The anode gas inlet 27, just as a cathode gas inlet 29 and a burner waste gas outlet 30, is passed through the bracing housing 4. These ducts may be made gas-tight. Furthermore, a recirculating port 31, via which anode waste gas can be removed from the system in order to be fed, for example, to a reformer, is led in the example through the bracing housing 4. The housing parts 6, 7 may be of a one-part design or of a multipart design to embody the inlets and outlets in a simplified manner, with partition planes extending in the area of the inlets and outlets. The individual components of the housing parts 6, 7 can be connected to one another with corresponding joints, which are also used to connect the two housing parts 6, 7 to one another and were explained in more detail with reference to FIGS. 1 through 4 as well as 7 through 9. In particular, pulling elements and longitudinal guides may be used there as well.

The fuel cell stack 2, residual gas burner 20 and heat exchanger 21 form a fuel cell module 32 here, which represents a unit that can be completely preassembled and which can be inserted into the bracing housing 4. Since the additional components, such as the residual gas burner 20, compensator 28, heat exchanger 21, deflecting section 24, compensator 25 and distributor chamber 26, cannot be subjected to strong prestressing forces 9, they are uncoupled therefrom by means of the support frame 11. Support frame 11 is supported at the cover part 7, on the one hand, and at the fuel cell stack 2, on the other hand. For example, the support frame 11 comprises for this two support plates 33, which are supported at each other via four pressure bars 34. One support plate 33 is supported now at the bottom 16 of the cover part 7, while the other support plate 33 is supported at the fuel cell stack 2. The residual gas burner 20 is mounted in the example at the fuel cell stack 2 such that a recess 35, through which the support plate 33 associated with the fuel cell stack 2 can be passed, is present between the residual gas burner 20 and one end plate 12. This support plate 33 can thus be supported directly at the corresponding end plate 12 at the fuel cell stack 2 without the residual gas burner 20 being stressed.

The pulling elements 8 are omitted in FIG. 5. As in FIGS. 1 through 4, they may be embodied by tie rods or by tightening straps. The compensators 25, 28 compensate different thermal expansion effects of the components of the fuel cell module 32, which are connected to one another by means of the compensators 25, 28, especially during the heating up of the fuel cell system 1.

While specific embodiments of the invention have been described in detail to illustrate the application of the principles of the invention, it will be understood that the invention may be embodied otherwise without departing from such principles.

What is claimed is:

1. A fuel cell system, especially for a motor vehicle, the fuel cell system comprising:
    a fuel cell stack comprising a plurality of fuel cell elements stacked up one upon the other, in which an electrolyte separates an anode space from a cathode space;
    a bracing housing accommodating the fuel cell stack in a gas tight housing interior space, the bracing housing including a cover part with an interior side, a pot part with an interior side and pulling elements, the fuel cell stack being supported in the interior space by the mutually opposite cover part interior side and pot part interior side, which are or can be prestressed towards one another, in a prestressing direction, by means of the pulling elements.

2. A fuel cell system in accordance with claim 1, wherein the pulling elements comprise tightening straps or tie rods.

3. A fuel cell system in accordance with claim 1, wherein the fuel cell stack has an end plate at each of a cover part side and a pot part side, wherein the pot part and the cover part are supported in the interior at the end plates of the fuel cell stack.

4. A fuel cell system in accordance with claim 1, wherein the pot part and the cover part engage with each other coaxially in a prestressing direction.

5. A fuel cell system in accordance with claim 1, wherein the pot part and the cover part each have a flexurally rigid bottom, which extends in a plane extending at right angles to the prestressing direction.

6. A fuel cell system in accordance with claim 1, wherein the pot part and/or the cover part are supported directly at the fuel cell stack.

7. A fuel cell system in accordance with claim 1, further comprising:
    one or more fuel cell system component components in the interior space; and
    a support frame for indirectly supporting one of the pot part or the cover part at the fuel cell stack, the support frame at least one of uncoupling and relieving the at least one fuel cell component from the prestressing.

8. A fuel cell system in accordance with claim 1, wherein the pulling elements are arranged exclusively on an outer side of the bracing housing.

9. A fuel cell system in accordance with claim 1, wherein the pulling elements are passed at least partly through the interior of the bracing housing.

10. A fuel cell system in accordance with claim 1, wherein a longitudinal guide is provided, which guides the cover part and pot part in parallel to the prestressing direction.

11. A fuel cell system in accordance with claim 1, wherein the cover part has a cylindrical design with a closed end.

12. A fuel cell system in accordance with claim 1, wherein the bracing housing comprises a heat-insulating insulation box.

13. A fuel cell system comprising:
    a fuel cell stack comprising a plurality of fuel cell elements stacked up one upon the other, each of the fuel cell elements having electrolyte separating an anode space from a cathode space;
    a bracing housing accommodating the fuel cell stack in a housing interior space, said bracing housing including a cover part with an interior side, a pot part with an interior side and pulling elements, at least a portion of said cover part being arranged inside said pot part, the fuel cell stack being supported in the interior space by the mutually opposite cover part interior side and pot part interior side, the pulling elements applying force to said cover part and to said pot part to apply force to said stack from opposite sides via the mutually opposite cover part interior side and pot part interior side.

14. A fuel cell system in accordance with claim 13, wherein the pulling elements comprise tightening straps or tie rods
    the fuel cell stack has an end plate at each of a cover part side and a pot part side, wherein the pot part and the cover part are supported in the interior at the end plates of the fuel cell stack,
    the pot part and the cover part each include coaxial portions extending in a direction of applied force with the coaxial portions engaging one another;
    one or more fuel cell system components are arranged in the interior space;
    a support frame is arranged in the interior space for indirectly supporting one of the pot part or the cover part at the fuel cell stack, the support frame at least one of uncoupling and relieving the at least one fuel cell component from the applied force;
    the pulling elements are arranged exclusively on an outer side of the bracing housing;
    a longitudinal guide is provided, which guides the cover part and pot part in parallel to a direction of force application;
    the cover part has a cylindrical design with a closed end; and
    the bracing housing comprises a heat-insulating insulation box.

15. A fuel cell system in accordance with claim 13, wherein the pulling elements are passed at least partly through the interior of the bracing housing.

16. A fuel cell system comprising:
    a plurality of fuel cell elements aligned to form a fuel cell stack, each of said fuel cell elements defining an anode space and a cathode space, said each of said fuel cell elements having an electrolyte separating said anode space from said cathode space;

a first housing part having a cylindrical wall with an open end and a closed end;

a second housing part having a cylindrical wall with an open end and a closed end, said first and second housing parts being arranged to have said cylindrical wall of said first housing be slidable in said open end of said second housing, said first and second housing parts defining an interior space inside said housing parts when said first housing part is inside said cylindrical wall of said second housing part, said fuel cell stack being arranged in said interior space, said cylindrical walls and said closed ends being arranged to form a gas-tight housing around said interior space with said first housing part being slidable with respect to said second housing part;

biasing elements applying a biasing force to said first and second housing parts, said biasing elements and said first and second housing parts applying the biasing force to said fuel cell stack to compress said fuel cell stack.

17. A fuel cell system in accordance with claim 16, wherein:
said cylindrical walls of said first and second housing parts are closed in a circumferential direction.

18. A fuel cell system in accordance with claim 16, wherein:
said cylindrical walls of said first and second housing parts together form gas tight guiding surfaces for movement of the first and second housing parts toward and away from each other.

19. A fuel cell system in accordance with claim 16, wherein:
said cylindrical wall of said first housing part is a double wall structure;
said cylindrical wall of said second housing part is slidably arranged between said double wall structure.

20. A fuel cell system in accordance with claim 19, further comprising:
a sealing material arranged between said double wall structure of said first housing part, said sealing material forming a gas barrier between said cylindrical walls of said first and second housing parts.

* * * * *